: US010725898B2

United States Patent
Chang et al.

(10) Patent No.: US 10,725,898 B2
(45) Date of Patent: Jul. 28, 2020

(54) TESTING NETWORK FRAMEWORK AND INFORMATION MANAGEMENT METHOD APPLIED THERETO

(71) Applicant: Primax Electronics Ltd., Taipei (TW)

(72) Inventors: Pei-Ming Chang, Taipei (TW); Pao-Chung Chao, Taipei (TW); Shih-Chieh Hsu, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 0 days.

(21) Appl. No.: 15/991,092

(22) Filed: May 29, 2018

(65) Prior Publication Data

US 2019/0251021 A1   Aug. 15, 2019

(30) Foreign Application Priority Data

Feb. 13, 2018   (TW) .............................. 107105316 A

(51) Int. Cl.
| | |
|---|---|
| G06F 11/36 | (2006.01) |
| G06F 21/44 | (2013.01) |
| G06F 21/57 | (2013.01) |
| H04L 29/08 | (2006.01) |
| H04L 29/06 | (2006.01) |

(52) U.S. Cl.
CPC ...... *G06F 11/3688* (2013.01); *G06F 11/3664* (2013.01); *G06F 21/44* (2013.01); *G06F 21/577* (2013.01); *H04L 67/34* (2013.01); *H04L 63/0272* (2013.01)

(58) Field of Classification Search
CPC .. G06F 11/3688; G06F 21/44; G06F 11/3664; G06F 21/577; H04L 67/34; H04L 63/0272
See application file for complete search history.

(56) References Cited

U.S. PATENT DOCUMENTS

| | | | | |
|---|---|---|---|---|
| 7,051,087 B1* | 5/2006 | Bahl | ................... | H04L 29/1232 709/220 |
| 7,194,371 B1* | 3/2007 | McBride | ............... | G06F 19/322 600/300 |
| 8,526,924 B1* | 9/2013 | Annan | ..................... | H04L 69/16 455/414.3 |
| 9,170,870 B1* | 10/2015 | Masterson | .......... | G06F 11/0766 |
| 9,274,935 B1* | 3/2016 | Lachwani | ........... | G06F 11/3688 |

(Continued)

*Primary Examiner* — Ziaul A Chowdhury
(74) *Attorney, Agent, or Firm* — Kirton McConkie; Evan R. Witt

(57) ABSTRACT

An information management method for a testing network framework is provided. The testing network framework includes a first server and at least one computer. The method includes the following steps. Firstly, the at least one computer downloads and executes a test application program. Then, the at least one computer is connected to the first server, and provides a device identification code and a network address value of the at least one computer to the first server. If the first server judges that the corresponding device identification code complies with a first default condition and the corresponding network address value complies with a second default condition, the corresponding computer is authenticated, and a test setting information is provided from the first server to the corresponding computer. After the test setting information is downloaded to the corresponding computer, a test process is performed.

14 Claims, 2 Drawing Sheets

(56) References Cited

U.S. PATENT DOCUMENTS

| | | | | |
|---|---|---|---|---|
| 9,521,564 B2* | 12/2016 | Zhao | ............... | H04W 24/06 |
| 2005/0282523 A1* | 12/2005 | Yoshihara | ............ | H04L 67/125 |
| | | | | 455/411 |
| 2006/0190736 A1* | 8/2006 | John | ............... | H04L 63/102 |
| | | | | 713/182 |
| 2008/0229149 A1* | 9/2008 | Penton | ............... | G06F 11/36 |
| | | | | 714/30 |
| 2011/0060945 A1* | 3/2011 | Leprince | ............ | G06F 11/0748 |
| | | | | 714/25 |
| 2011/0276960 A1* | 11/2011 | Nakamoto | ............... | G06F 8/61 |
| | | | | 717/178 |
| 2012/0210209 A1* | 8/2012 | Biddle | ............... | G06F 11/3688 |
| | | | | 715/234 |
| 2016/0191349 A1* | 6/2016 | Buege | ............... | G06F 11/3692 |
| | | | | 709/224 |
| 2017/0257383 A1* | 9/2017 | Ficarra | ............... | H04L 63/1408 |
| 2018/0324159 A1* | 11/2018 | Koya | ............... | H04L 63/062 |
| 2019/0007405 A1* | 1/2019 | Dunne | ............... | G06F 16/9017 |
| 2019/0065352 A1* | 2/2019 | Patel | ............... | G06F 11/3664 |

* cited by examiner

TESTING NETWORK FRAMEWORK AND INFORMATION MANAGEMENT METHOD APPLIED THERETO

FIELD OF THE INVENTION

The present invention relates to a testing network framework and an information management method, and more particularly to a network framework and a management method for separately recording a test application program and a test setting information and managing and protecting the information through identity authentication.

BACKGROUND OF THE INVENTION

With the advance of industry and technology, various computers and their peripheral devices, communication devices and consumer electronics devices, which are also referred as 3C products, have been widely used by people in their daily lives. Generally, these products are designed and manufactured in more than one enterprise or company or in more than one location. After the products are fabricated, the products are subjected to final factory inspection and thus the manufacturing processes are completed. In other words, the high quality and competitive products are produced through the cooperation between different teams.

Since these teams possibly belong to different enterprises, companies or production units, it is important to have good information transfer and instructions in the process of completing a product in order to facilitate the work. Moreover, for avoiding the possible information theft, the protection and control of information should be taken into consideration.

For example, when an electronic product designed by Party A is submitted to a certain Party B for manufacture and production, the finished product must comply with the standards and specifications of Party A. Consequently, Party B will test the finished product with the testing program which is provided by Party A. However, in order to manufacture better products or meet user needs, the test contents may be changed and updated. In other words, the test standards and specifications are continuously adjusted by Party A, or the test results are usually provided from Part B to Party A for assessment. Consequently, the testing program has to be re-packed by Part B. This usually perplexes Party B in the test process.

Furthermore, various settings in the testing process are usually the results of the efforts made by Party B through the repeated test process. Moreover, the re-packed testing program also contains these settings. In case that the cooperative units for Part A are changed, these results are directly used by the new units as a whole. Since different manufacturers are usually the market competitors of Part B, the results used by the new units may cause losses to Party B. However, if a password protection for the relevant information or testing settings is made to confirm the identity of the user, the overall operation becomes more complicated. Moreover, if the password is cracked, the information to be protected is possibly stolen by the competitors.

For solving the above drawbacks, it is important to improve the conveniences of manufacturing and testing products.

SUMMARY OF THE INVENTION

The present invention provides a testing network framework and an information management method. In the testing network framework and the information management method, the test application program and the test setting information are separately provided, and the identities of the computers are effectively authenticated and the computers for performing the test process are authenticated according to the device identification codes and the network address values of the computers. Consequently, the purpose of managing and protecting the information is achieved.

In accordance with an aspect of the present invention, there is provided an information management method for a testing network framework. The testing network framework includes a first server and at least one computer. The information management method includes the following steps. Firstly, the at least one computer downloads and executes a test application program. Then, the at least one computer is connected to the first server, and provides a device identification code and a network address value of the at least one computer to the first server. If the first server judges that the corresponding device identification code complies with a first default condition and the corresponding network address value complies with a second default condition, the corresponding computer is authenticated, and a test setting information is provided from the first server to the corresponding computer. After the test setting information is downloaded to the corresponding computer, a test process is performed. The test setting information corresponds to the test application program.

In accordance with another aspect of the present invention, there is provided a testing network framework with an information management function. The testing network framework includes a first server and at least one computer. After a test application program is downloaded to the at least one computer, the test application program is executed in the at least one computer. When the at least one computer is connected to the first server, a device identification code and a network address value of the at least one computer are provided to the first server. If the first server judges that the corresponding device identification code complies with a first default condition and the corresponding network address value complies with a second default condition, the corresponding computer is authenticated, and a test setting information is provided from the first server to the corresponding computer. After the test setting information is downloaded to the corresponding computer, a test process is performed. The test setting information corresponds to the test application program.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
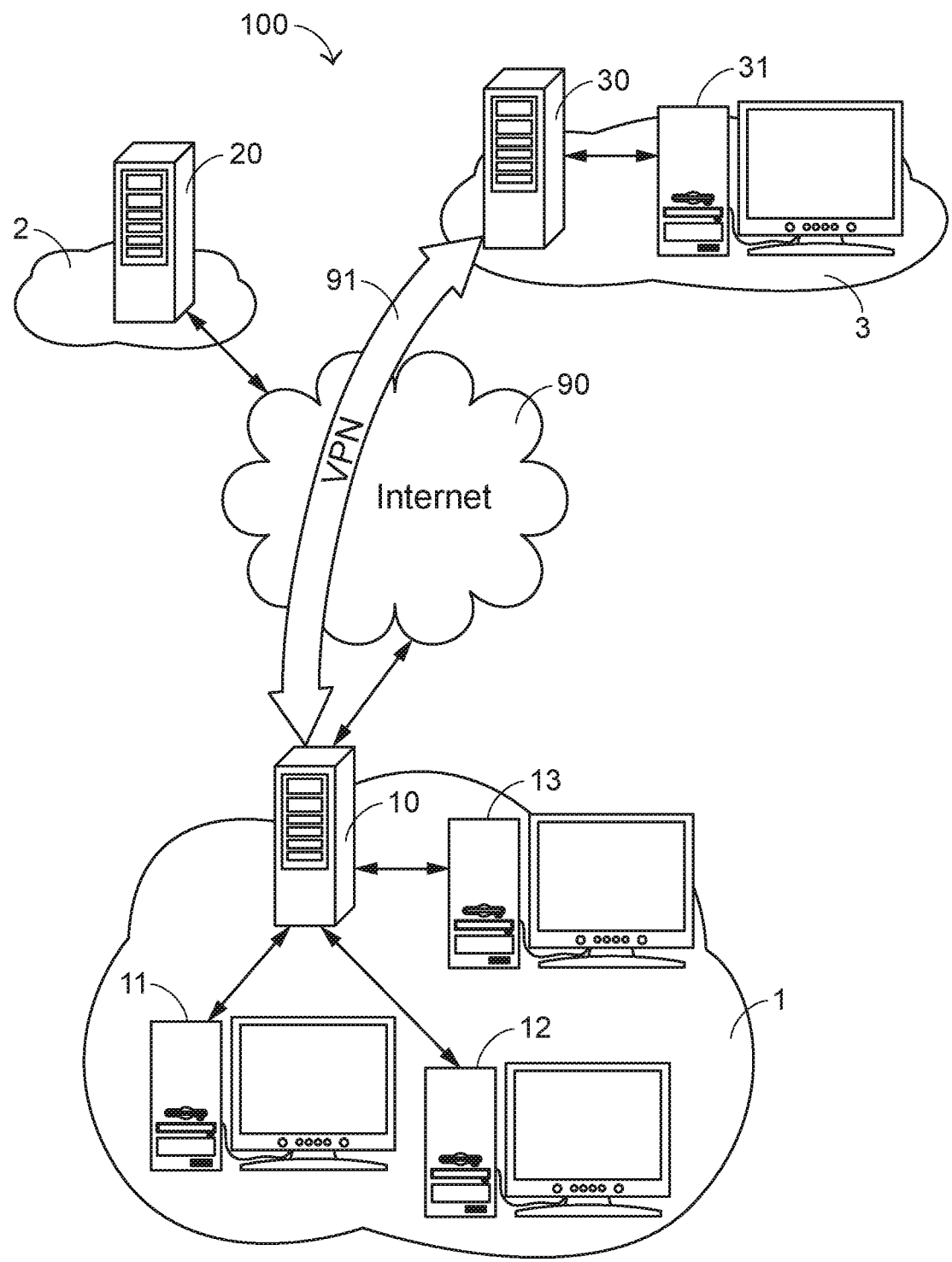
FIG. 1 schematically illustrates the architecture of a testing network framework according to an embodiment of the present invention.

The present invention provides a testing network framework and an information management method. An example of a testing network framework will be described as follows. FIG. 1 schematically illustrates the architecture of a testing network framework according to an embodiment of the present invention. As shown in FIG. 1, the testing network framework 100 comprises plural network systems. That is, the testing network framework 100 comprises plural computers and plural servers, which belong to different domains. These servers include a first server 10, a second server 20 and a third server 30. The first server 10 and the computers 11, 12 and 13 belong to the first domain 1. The third server 30 and the computer 31 belong to the third domain 3.

The computers 11, 12 and 13 are used for performing a testing task. For example, these computers test the functions of associated electronic products in a production line and recognize their quality before the electronic products leave the factory. As mentioned above, the products are designed and manufactured through the cooperation of many different units, including software development units, hardware development units and manufacturing units. The three network systems in the testing network framework 100 of FIG. 1 represent the operating units or manufacturing locations belonging to three different domains 1, 2 and 3.

The number of computers as shown in FIG. 1 is determined according to the allocation of the production line or the condition of manufacturing the products. Usually, plural computers and plural test workers cooperate to complete the testing task. It is noted that only one is also able to complete the designated testing task. That is, the testing network framework 100 comprises at least one computer to perform the testing task.

In this embodiment, the first server 10 and the second server 20 of the testing network framework 100 belong to different companies or enterprises, and the first server 10 and the third server 30 belong to the same company or enterprise. For example, the second server 20 belongs to a company or enterprise (e.g., Part A) that is responsible for designing an electronic product, and the first server 10 and the third server 30 belong to a company or enterprise that is commissioned by Party A and responsible for manufacturing, producing and testing the electronic product (Part B). Moreover, the third server 30 represents the head office of Part B for rear-end monitoring, and the first server 10 represents a branch office of Part B in the location of the production line.

Moreover, the first server 10 and the second server 20 are in connection with each other through the internet 90. In an embodiment, the connection is established according to an open network design. That is, the information contents or files recorded in the second server 20 are open to be downloaded by any device. As mentioned above, Part B corresponding to the first service 10 and Part A corresponding to the second server 20 have a cooperative relationship. In an embodiment, the first server 10 is designated to have authority (or through a password) to be in connection with the second server 20.

In accordance with a feature of the present invention, the connection between the first server 10 and the third server 30 is established according to a close network design. That is, after the identity is authenticated, the connection between the first server 10 and the third server 30 is established.

As shown in FIG. 1, the third server 30 and the first server 10 are in connection with each other through a virtual private network (VPN) 91. The virtual private network is a virtual network frame that extends a private network across a public network 90 (e.g., the internet) through the use of tunneling protocols and encryption and decryption. Consequently, the virtual private network has the benefits of convenience and security. Moreover, the VPN technology is easily expanded and has cost-effectiveness.

It is noted that the way of establishing the connection between the third server 30 and the first server 10 is not restricted. For example, in another embodiment, the connection between the third server 30 and the first server 10 is established through a dedicated communication pipeline. Consequently, the connection quality is enhanced, but the construction cost is possibly increased.

In accordance with another feature of the present invention, the resources provided to each computer for performing the test process are divided into two portions. The first portion is a test application program that is provided by the owner of the second server 20, i.e., Part A. The second portion is a test setting information that is provided by the owner of the first server 10 and the third server 30 for manufacturing, producing and testing the electronic product, i.e., Part B.

As mentioned above, the test application program is provided from the product designer (i.e., Part A) to the manufacturer (i.e., Part B) when the cooperative relationship is effective. In accordance with the present invention, even if Part A changes and updates the test contents or adjusts the test standards and specifications, the setting information contents of Part B in the test process (e.g., the test setting parameters in the mouse's DPI test) are independent. Consequently, the test application program provided from Part A will not be re-packed by Part B.

As mentioned above, the test setting information corresponds to the test application program. That is, the test setting information can be directly introduced into the test application program for applications. In other words, the test setting information may be modified by Part B according to the practical requirements, but the test application program is still the version provided by Part A. The contents of the test application program will not be changed by Part B. However, the test setting information provided by Part B can be applied to the test application program. In case of the permission of Part B, the test setting information obtained from the repeated tests will be provided to a terminal device so as to be utilized or downloaded. In such way, the information can be managed and protected.

In an embodiment, the test setting information is recorded in the third server 30. In case of permission, the third server 30 is in connection with the first server 10. Consequently, the computers authenticated by the first server 10 can download the test setting information.

In an embodiment, the test setting information is saved as a property list file or an initial profile. For a general operation system, the test setting information is a file with a filename extension ".plist" or ".ini", and the test setting information contains only the text content and does not contain the program. However, the test setting information can be applied to the test application program. Moreover, since both of the third server 30 and the first server 10 belong to the manufacturer (i.e., Part B), the supervisor of Part B is accessible to the third server 30 to update the test setting information in order to reflect the test results.

Figure 2:
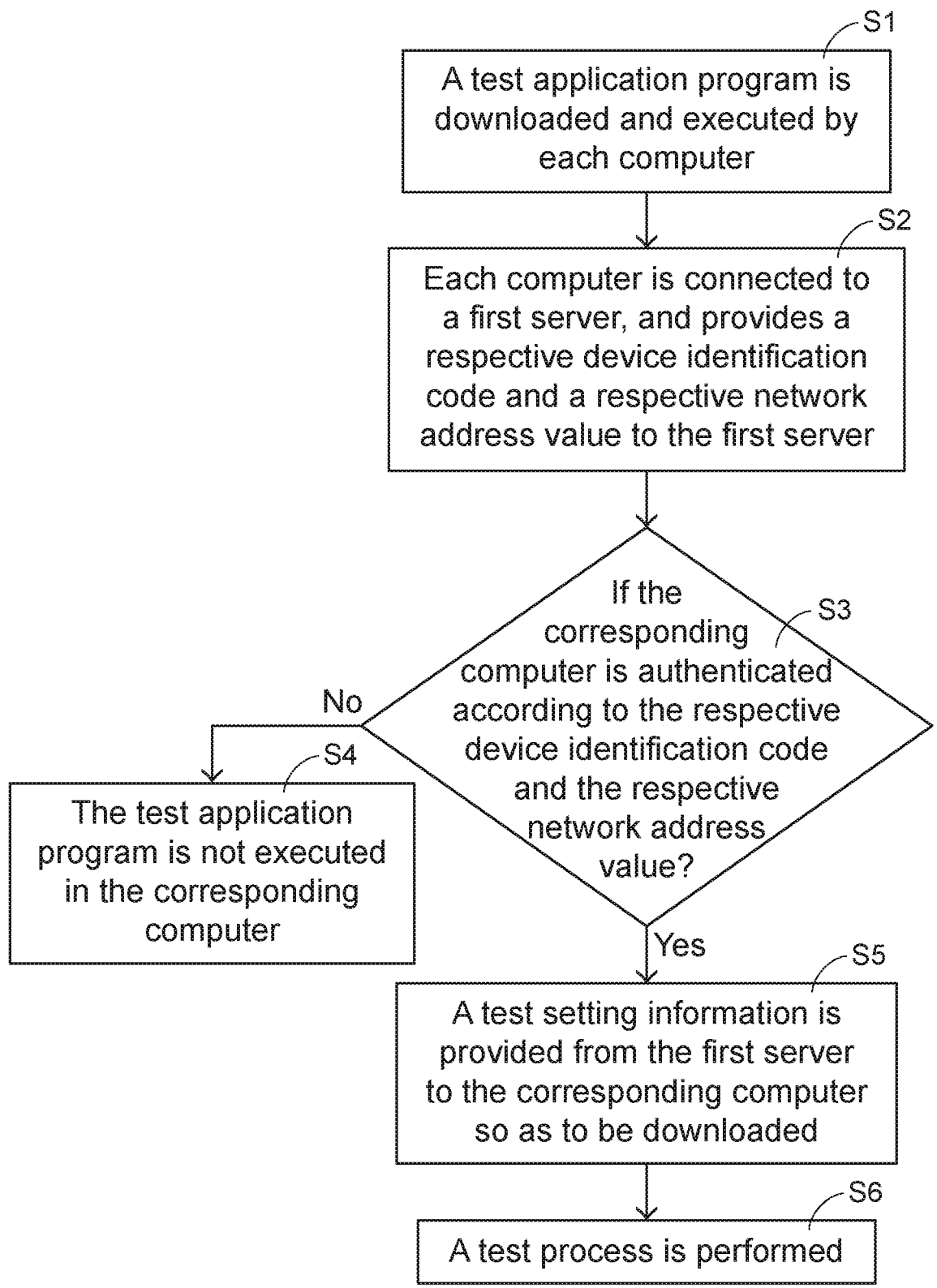
FIG. 2 is a flowchart illustrating an information management method according to an embodiment of the present invention.

FIG. 2 is a flowchart illustrating an information management method according to an embodiment of the present invention. Firstly, a test application program is downloaded and executed by all of the computers 11, 12 and 13 (Step S1).

Then, the computers 11, 12 and 13 are in connection with a first server 10, and the respective device identification codes and the respective network address values are provided to the first server 10 (Step S2). Then, the first server 10 judges whether the computers 11, 12 and 13 are authenticated according to the respective device identification codes and the respective network address values (Step S3). If the first server 10 judges that the corresponding computer is authenticated, a test setting information is provided from the first server 10 to the corresponding computer so as to be downloaded (Step S5). Then, a test process is performed (Step S6). Whereas, if the first server 10 judges that the corresponding computer is not authenticated, the test application program is not executed in the corresponding computer (Step S4).

In the step S1, the test application program is provided by the product designer, i.e., Part A (the owner of the second server 20). After any of the computers 11, 12 and 13 are in connection with the second server 20, the test application program is provided to the corresponding computer so as to be downloaded by the corresponding computer. In the embodiment of FIG. 2, the computers 11, 12 and 13 in the domain 1 are connected with the first server 10 in a wired transmission manner. That, the computers 11, 12 and 13 may not have the wireless networking functions. After these computers are connected with the first server 10, these computers are connected with the second server 20 through the first server 10 and the internet 90.

As mentioned above, the test application program and the test setting information are separately provided. In a situation, the test application program provided by Part A is seldom updated. In another situation, the test application program is updated, but the old version is effective. In other words, the way of downloading the test application program is not restricted to establish the connection between the corresponding computer and the second server 20. In another embodiment, the test application program is provided by a data recording unit that is electrically connected with the corresponding computer.

Generally, the size of the test application program is not very large. In case that the test application program has been successfully downloaded by another computer, the test application program may be read from and stored into a data recording unit (e.g., a USB flash drive or an optical disc). After the test application program is transferred from the data recording unit to the corresponding computer, the test application program is downloaded to the corresponding computer. Moreover, during the time period of establishing the connection between the first server 10 and the second server 20, a copy of the test application program is generated in the first server 10. In case that the computer intends to download the test application program, the computer will download the test application program from the first server 10 without the need of connecting to the second server 20.

The step S2 is especially performed on the computers 11, 12 and 13 in the domain 1 where the first server 10 belongs. In a preferred embodiment, the step S2 is automatically performed after the test application program is loaded to the corresponding computers. Moreover, the computers 11, 12 and 13 search and connect to the first server 10 according to the default connection information in the test application program. After the connection is completed, the device identification codes and the network address values are automatically provided to the first server 10. Consequently, the subsequent authenticating process will be performed.

In an embodiment, the device identification code is the address or the number of a network card of the corresponding computer. That is, the networking connection of the computer is enabled through the corresponding network card. According to current technology, the general network card theoretically has a unique media access control address (MAC address), which is also referred as a local area network (LAN) address, an Ethernet address or a physical address. For example, the MAC address is a set of 12-digit hexadecimal value. The device identification code is the MAC address representing the identity of the device in the network. Since the MAC address is unique, the MAC address can be used as the identification code for discriminating each computer or network product. Consequently, the user can be recognized.

Moreover, the network address value is a networking connection address of the corresponding computer in the network. That is, the network address value is an internet protocol (IP) address. The IP address contains a network bits and a host bits. The IP address is used to identify the corresponding computer on the network. That is, the IP address shows the source of the corresponding computer that is connected to the internet.

The step S3 further comprises the following steps. If the first server 10 judges that the corresponding device identification code complies with a first default condition and the corresponding network address value complies with a second default condition, the first server 10 judges that the corresponding computer is authenticated. Whereas, if the first server 10 judges that the corresponding device identification code does not comply with the first default condition or the corresponding network address value does not comply with the second default condition, the first server 10 judges that the corresponding computer is not authenticated. Consequently, the first server 10 has to take the device identification code and the network address value of the corresponding computer into consideration. If the corresponding device identification code is contained in a registered data through comparison, the first default condition is satisfied. If the corresponding network address value belongs to a default domain, the second default condition is satisfied.

Moreover, Part B can determine which computers in the domain 1 (especially the computers 11, 12 and 13) are used to perform the test process and manage the device identification codes of these computers as the registered data. When any computer is in connection with the first server 10, the first server 10 compares the corresponding device identification code with the registered data. The first server 10 can judge whether the first default condition is satisfied according to the comparing result. That is, if the device identification code of the computer connected with the first server 10 is included in the registered data, the first default condition is satisfied. Whereas, if the device identification code of the computer connected with the first server 10 is not included in the registered data, the first default condition is not satisfied.

Moreover, Part B can determine which domain (especially the domain 1) is used to perform the test process and define the domain as a default domain. For example, this domain is used as the domain of the branch office in the production line location. When any computer is in connection with the first server 10, the first server 10 checks whether the network address value belongs to the default domain. The first server 10 can judge whether the second default condition is satisfied according to the checking result. That is, if the network address value of the computer connected with the first server 10 belongs to the default domain, the second default condition is satisfied. Whereas, if the network address value of the computer connected with the first server 10 does not belong to the default domain, the second default condition is not satisfied.

In accordance with another feature of the present invention, the computer is determined as an unauthenticated device as long as any of the first default condition for the device identification code and the second default condition for the network address value is not satisfied. The unauthenticated device represents an unauthorized illegal device or an illegal connection status. The test setting information is not allowed to be provided and downloaded to the unauthenticated device.

Consequently, if the first server 10 judges that the corresponding computer is not authenticated in the step S3, the test application program is not executed in the corresponding computer and the connection is interrupted (Step S4). In such way, the purpose of managing and protecting the information is achieved. Moreover, the step S4 may be further modified. For example, a prompt message indicating an erroneous or abnormal situation is further shown on the corresponding computer. The prompt message notifies the user that the judgement is repeatedly done after the erroneous or abnormal situation is eliminated.

Moreover, if the device identification code and the network address value of the corresponding computer comply with the first default condition and the second default condition, respectively, the judging result of the step S3 indicates that the corresponding computer is authenticated. In an embodiment, the first server 10 is in connection with the third server 30 through the virtual private network (VPN) 91. Since the corresponding computer is authenticated, the first server 10 requests the third server 30 for the test setting information, and then provides to the corresponding computer so as to be downloaded (Step S5).

After the test setting information is downloaded to the corresponding computer, the test setting information is introduced into the test application program. Meanwhile, the corresponding computer is ready to perform the test process.

As mentioned above, after the identity of the corresponding computer is authenticated by the first server 10 in the location of the branch office, the first server 10 is in connection with the third server 30 in the location of the head office to acquire the test setting information. That is, in addition to the acquirement of the device identification code and the network address value, it is necessary to establish the closed connection path between the third server 30 and the first server 10 in order to acquire the test setting information. This allocation results in a two-layered network framework. That is, the first server 10 in the first layer is responsible for the identity authentication management, and the third server 30 in the second layer is responsible for the rear-end update processing task.

In a possible situation, a specified computer is registered and thus the specified computer is able to download the test setting information in the default domain. If the specified computer is not in the default domain (for example the specified computer is taken to a place outside the production line), the test setting information cannot be downloaded to the specified computer because the second default condition is not satisfied. Under this circumstance, even if the specified computer is intended to be in connection with the first server 10 through an external connection path (e.g., the internet 90), the first server 10 judges that the specified computer is not authenticated because the second default condition is not satisfied.

In another possible situation, a specified computer outside the default domain cannot be connected to the first server 10. Consequently, the first server 10 cannot judge the specified computer. As mentioned above, the test setting information has to be downloaded from the first server 10. Since the specified computer outside the default domain cannot be connected to the first server 10, the test setting information will not be leaked out through the above network framework.

In the above embodiment, the authenticating process is performed by the first server 10. It is noted that numerous modifications and alterations may be made while retaining the teachings of the invention. For example, in a special or emergency situation, the third server 30 is disabled by the supervisor of the manufacturer (i.e., Part B). Regardless of whether the corresponding computer is authenticated or not, the test setting information cannot be downloaded to the corresponding computer. In such way, the purpose of managing and protecting the information is achieved.

In another embodiment, the corresponding computer (e.g., the computer 31) is directly placed in the domain 3 where the third server 30 belongs. Consequently, the third computer 31 is directly connected to the third server 30 to acquire the test setting information. For example, the product designer (i.e., Part A) or other designer may discuss with the manufacturer (i.e., Part B) in the location of the head office of the manufacturer in order to download the test setting information. In this embodiment, the third server 30 is designed to have the authenticating function or information management function of the first service 10. That is, the third server 30 can perform the above judgment. However, it is necessary to register the device identification code of the associated computer. In addition, the domain 3 where the third server 30 belongs is defined as the default domain.

Alternatively, in another embodiment, the test setting information is directly recorded in the first server 10 and not recorded in the third server 30. After the corresponding computer is authenticated by the first server 10, the test setting information is directly provided to the corresponding computer so as to be downloaded. Under this circumstance, it is not necessary to establish the connection between the first server 10 and the third server 30. This embodiment can simplify the architecture of the above embodiment while achieving the identical or similar purposes. However, since the third server 30 and the first sever 10 belong to different units, the information is not managed and controlled by the rear end and the information is possibly leaked.

From the above descriptions, the present invention provides a testing network framework and an information management method. When compared with the conventional technologies, the technologies of the present invention have the following benefits. Firstly, in case that the test application program or the test standards and specifications of the designer (i.e., Part A) are changed, the test setting information of the manufacturer (i.e., Part B) is independently recorded. Moreover, the test setting information can be downloaded and updated. Consequently, it is not necessary to re-pack the test application program. Secondly, after the test setting information is downloaded, the test setting information can be directly introduced into the test application program for applications. Since it is not necessary to manually input various setting parameters, the test process is time-saving. Thirdly, since the identities of the computers are effectively authenticated and the computers for loading the test setting information are realized according to the device identification codes and the network address values, the purpose of managing and protecting the information is achieved.

The testing network framework and the information management method of the present invention can effectively solve the drawbacks of the conventional technology while achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An information management method for a testing network framework, the testing network framework comprising a first server, a third server, and at least one computer, the information management method comprising steps of:
    allowing the at least one computer to download and execute a test application program;
    allowing the at least one computer to be connected to the first server, and providing a device identification code and a network address value of the at least one computer to the first server, wherein said device identification code is the address or the number of a network card, and said network address value is the IP address;
    allowing the at least one computer to be connected to the third server, and providing the device identification code and the network address value of the at least one computer to the third server; and
    if the first server judges that the corresponding device identification code complies with a first default condition and the corresponding network address value complies with a second default condition, confirming that the corresponding computer is authenticated and providing a test setting information from the first server to the corresponding computer, wherein after the test setting information is downloaded to the corresponding computer, a test process is performed,
    wherein the test setting information corresponds to the test application program, and the test setting information can be directly introduced into the test application program for applications,
    wherein the test setting information is provided by the first server and the test application program is provided by a second server,
    wherein the test setting information is recorded in the third server, wherein the third server and the first server are in connection with each other through a virtual private network or a dedicated communication pipeline, and the test setting information is provided from the third server to the first server,
    if the third server judges that the corresponding device identification code complies with the first default condition and the corresponding network address value complies with the second default condition, confirming that the corresponding computer is authenticated and providing the test setting information from the third server to the corresponding computer, wherein after the test setting information is downloaded to the corresponding computer, the test process is performed.

2. The information management method according to claim 1, wherein the test application program is provided by the second server when the at least one computer is connected to the second server.

3. The information management method according to claim 2, wherein the first server and the second server belong to different companies or enterprises.

4. The information management method according to claim 1, wherein if the corresponding device identification code is contained in a registered data through comparison, the first default condition is satisfied, wherein if the corresponding network address value belongs to a default domain, the second default condition is satisfied.

5. The information management method according to claim 1, wherein if the first server judges that the corresponding device identification code does not comply with the first default condition or the corresponding network address value does not comply with the second default condition, the first server judges that the corresponding computer is not authenticated and the test application program is not executed in the corresponding computer.

6. The information management method according to claim 1, wherein a supervisor is accessible to the third server to update the test setting information.

7. The information management method according to claim 1, wherein the test setting information is saved as a property list file or an initial profile.

8. A testing network framework with an information management function, the testing network framework comprising:
    a first server;
    a second server;
    a third server; and
    at least one computer that includes at least one CPU, where after a test application program is downloaded to the at least one computer, the test application program is executed in the at least one computer, wherein when the at least one computer is connected to the first server, a device identification code and a network address value of the at least one computer are provided to the first server, wherein said device identification code is the address or the number of a network card, and said network address value is the IP address,
    wherein if the first server judges that the corresponding device identification code complies with a first default condition and the corresponding network address value complies with a second default condition, the corresponding computer is authenticated, and a test setting information is provided from the first server to the corresponding computer, wherein after the test setting information is downloaded to the corresponding computer, a test process is performed, wherein the test setting information corresponds to the test application program, and the test setting information can be directly introduced into the test application program for applications,
    wherein the test setting information is provided by the first server and the test application program is provided by the second server,
    wherein the test setting information is recorded in the third server, wherein the third server and the first server are in connection with each other through a virtual private network or a dedicated communication pipeline, and the test setting information is provided from the third server to the first server,
    wherein when the at least one computer is connected to the third server, the device identification code and the network address value of the at least one computer are provided to the third server, wherein if the third server judges that the corresponding device identification code complies with the first default condition and the corresponding network address value complies with the second default condition, the corresponding computer is authenticated, and the test setting information is provided from the third server to the corresponding computer, wherein after the test setting information is downloaded to the corresponding computer, the test process is performed.

9. The testing network framework according to claim 8, wherein the test application program is provided by the second server when the at least one computer is connected to the second server.

10. The testing network framework according to claim 9, wherein the first server and the second server belong to different companies or enterprises.

11. The testing network framework according to claim 8, wherein if the corresponding device identification code is contained in a registered data through comparison, the first default condition is satisfied, wherein if the corresponding network address value belongs to a default domain, the second default condition is satisfied.

12. The testing network framework according to claim 8, wherein if the first server judges that the corresponding device identification code does not comply with the first default condition or the corresponding network address value does not comply with the second default condition, the first server judges that the corresponding computer is not authenticated and the test application program is not executed in the corresponding computer.

13. The testing network framework according to claim 8, wherein a supervisor is accessible to the third server to update the test setting information.

14. The testing network framework according to claim 8, wherein the test setting information is saved as a property list file or an initial profile.

* * * * *